(12) United States Patent
Chowdhary et al.

(10) Patent No.: US 9,824,380 B1
(45) Date of Patent: Nov. 21, 2017

(54) METHOD FOR OPTIMIZING A BUSINESS TRANSACTION

(71) Applicant: FORMULA LABS, LLC, Trumball, CT (US)

(72) Inventors: Manish Chowdhary, Trumbull, CT (US); Andrei Rosca, Stamford, CT (US)

(73) Assignee: Formula Labs, LLC, Trumbull, CT (US)

( * ) Notice: Subject to any disclaimer, the term of this patent is extended or adjusted under 35 U.S.C. 154(b) by 791 days.

(21) Appl. No.: 14/246,943

(22) Filed: Apr. 7, 2014

Related U.S. Application Data

(63) Continuation of application No. 13/835,160, filed on Mar. 15, 2013, now Pat. No. 8,694,389, which is a continuation of application No. 13/330,644, filed on Dec. 19, 2011, now Pat. No. 8,442,869, which is a continuation of application No. 11/691,169, filed on Mar. 26, 2007, now Pat. No. 8,082,183, which is a continuation of application No. 10/229,838, filed on Aug. 27, 2002, now Pat. No. 7,212,991.

(51) Int. Cl.
*G06Q 30/00* (2012.01)
*G06Q 30/06* (2012.01)
*G06Q 10/08* (2012.01)

(52) U.S. Cl.
CPC ..... *G06Q 30/0619* (2013.01); *G06Q 10/0833* (2013.01); *G06Q 10/0835* (2013.01); *G06Q 10/0837* (2013.01); *G06Q 30/0605* (2013.01); *G06Q 30/0635* (2013.01)

(58) Field of Classification Search
CPC ........... G06Q 30/06; G06Q 30/0601–30/0643; G06Q 30/08
See application file for complete search history.

(56) References Cited

U.S. PATENT DOCUMENTS 7,212,991 B2 * 5/2007 Chowdhary ......... G06Q 10/083
705/1.1
8,082,183 B2 * 12/2011 Chowdhary ......... G06Q 10/083
705/26.1

(Continued)

OTHER PUBLICATIONS

Affidavit of Manish Chowdhary Under C.F.R. 132, submitted in U.S. Appl. No. 13/834,029 on Jan. 9, 2017.

(Continued)

*Primary Examiner* — William Allen
(74) *Attorney, Agent, or Firm* — Amster, Rothstein & Ebenstein, LLP

(57) ABSTRACT

A method for coordinating a business transaction between a selling vendor and a shipping vendor including the steps of: presenting the shipping vendors selected by a transaction coordination hub to the selling vendor; approving at least one of the shipping vendors based on input of selling vendor; accepting an offer of the transaction based on the input of the shipping vendor; collecting payment, including commission from the selling vendor using a payment managing module; paying the shipping vendor using the payment management module; paying a shipping company and scheduling a time for product retrieval by the shipping company, using the payment management module and a shipping managing module; and tracking the product until delivery to a consumer.

2 Claims, 5 Drawing Sheets

(56) References Cited

U.S. PATENT DOCUMENTS

| | | | | |
|---|---|---|---|---|
| 8,442,869 B2* | 5/2013 | Chowdhary | ......... | G06Q 10/083 705/26.1 |
| 8,694,389 B1* | 4/2014 | Chowdhary | ......... | G06Q 10/083 705/26.1 |
| 2002/0059121 A1* | 5/2002 | Schneider | .............. | G06Q 10/08 705/28 |
| 2002/0184104 A1* | 12/2002 | Littman | ................. | G06Q 30/06 705/26.8 |

OTHER PUBLICATIONS

Affidavit of Manish Chowdhary Under C.F.R. 132, submitted in U.S. Appl. No. 13/797,555, on Jan. 10, 2017.

* cited by examiner

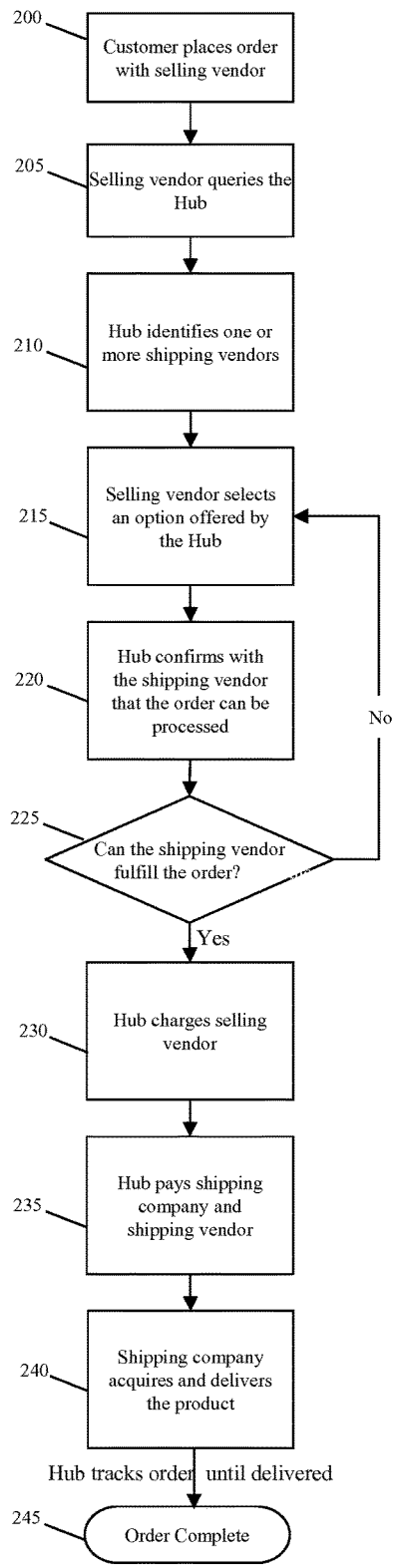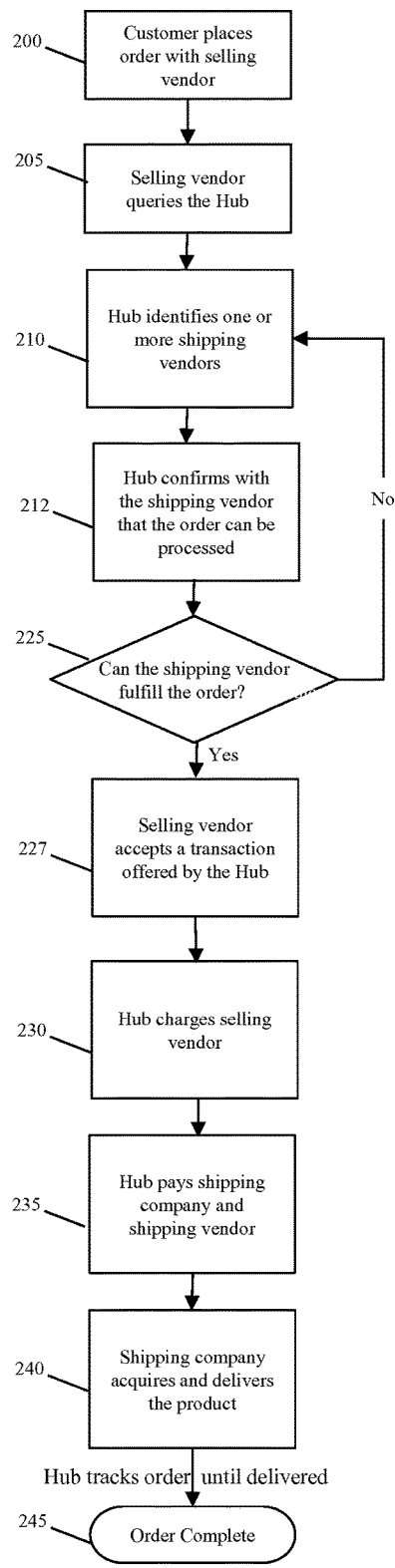
FIG. 2A
FIG. 2B

METHOD FOR OPTIMIZING A BUSINESS TRANSACTION

RELATED APPLICATIONS

This application is a continuation of U.S. patent application Ser. No. 13/835,160, filed Mar. 15, 2013, which in turn is a continuation of U.S. patent application Ser. No. 13/330,644, filed Dec. 19, 2011, now U.S. Pat. No. 8,442,869, which in turn is a continuation of U.S. patent application Ser. No. 11/691,169, filed Mar. 26, 2007, now U.S. Pat. No. 8,082,183, which in turn is a continuation of U.S. patent application Ser. No. 10/229,838, filed Aug. 27, 2002, now U.S. Pat. No. 7,212,991, the contents of all being incorporated herein by reference in their entirety.

TECHNICAL FIELD OF THE INVENTION

The present invention relates generally to automated systems and methods for coordinating business transactions, and specifically to an automated, Internet-based system and method for coordinating a variety of business transactions among multiple vendors of consumer products.

BACKGROUND OF THE INVENTION

The Internet provides vendors of consumer products and other types of products with a means to offer such products to consumers virtually anywhere in the world. In the United States, it is quite common for a consumer on the East Coast to access the Internet site of a merchant or vendor on the West Coast, browse the vendor's catalog of products, and place and order using a credit card from a terminal located in the home or in a business. If a transaction occurs in this manner, the West Coast vendor must ship the product or products across the county to fulfill the consumer's order.

The cost of shipping and handling for a particular good is typically included in the total purchase price that the consumer pays when purchasing goods by means of the Internet. Thus, the consumer will pay a specific amount determined by the vendor, regardless of what it actually costs the vendor to ship the product. Additionally, shipping the goods from different geographic locations often results in varying expenses for the vendor. These varying expenses are typically determined by the actual distance the packages have to travel to the customer. The cost of the shipment is also typically determined by the shipping service selected (overnight, two days, three days, etc.) as well as by the shipping company utilized by the vendor (e.g. UPS, FedEx, USPS). Thus, if a vendor who receives an order for a particular product can find a second vendor that is geographically closer to the consumer who can deliver the identical product in the same amount of time for less money than it would cost the first vendor to ship the product, using the same shipping company or a different one, the first vendor may be able to realize a significant savings from utilizing the second vendor to actually fulfill the order. The savings can then be divided between the vendors, or the vendors may realize other somewhat indirect benefits from participating in the type of transaction described.

Conceivably, identifying and coordinating transactions between multiple vendors would provide certain benefits to the vendors. Vendor-specific databases, and software that would permit the exchange of relevant product-related information between vendors, do not currently exist. Thus, for multiple vendors to participate in mutually beneficial collaborations, there is a need for an automated system and method by which vendors that are geographically distanced from another can be brought together to coordinate and optimize transactions involving the purchase of consumer goods or other goods.

SUMMARY OF THE INVENTION

The present invention provides a system for coordinating business transactions between vendors of consumer products, referred to herein as either selling vendors and/or shipping vendors. This system typically includes an electronic device for allowing a consumer to access a selling vendor's website, at least one server connected to the selling vendor's website for receiving purchase-related information from the consumer and sending and receiving information, at least one server connected to the shipping vendor's business network for receiving and sending communications, and a transaction coordination hub connected to the selling vendor's server and the shipping vendor's server for coordinating transactions between the selling vendor and the shipping vendor. For any given transaction, any of the vendors that are part of the system may act as a selling vendor or a shipping vendor.

The transaction coordination hub further includes a catalog subcomponent for storing detailed vendor-related data and a transaction coordinator software subcomponent for coordinating transactions between the selling vendors and the shipping vendors. The catalog subcomponent further includes a plurality of vendor catalog databases, at least one master catalog database, and a mapping engine for mapping information in the vendor catalogs to the master catalog. The transaction coordinator further includes an optimal deal finding software module for analyzing data found in the catalog subcomponent and pairing certain of the shipping vendors with certain of the selling vendors to execute business transactions.

This system also typically includes at least one server connected to the business networks of one or more shipping companies for processing shipping requests and inquiries received from the transaction coordination hub. The transaction coordinator software component includes a shipping manager software module for communicating with the server connected to the business network. The transaction coordinator subcomponent further includes a shipping manager software module, a vendor order manager software module, a vendor catalog manager software module, a vendor rating manager software module, a payment manager software module, a notification alert manager software module, and an auction manager software module.

The present invention can reduce unnecessary costs usually associated with the processing of transactions performed on-line. It enables vendors to collaborate towards fulfilling customer orders and share profits anonymously while not having to deal with the intricacies of transacting or even identifying a transaction partner. The vendors which are part of the Hub form an economy-scale network that can dramatically optimize various aspects of sales and inventory movement, extending the market outreach of its members to national and international levels, regardless of their size. The present invention also provides for the possibility of secondary revenue streams that utilize information collected in the system as part of its normal activity.

Further advantages of the present invention will become apparent to those of ordinary skill in the art upon reading and understanding the following detailed description of the preferred embodiments.

BRIEF DESCRIPTION OF THE DRAWINGS

FIG. 2a is a flow chart illustrating the flow of information in a typical transaction utilizing the automated transaction coordinator of the present invention.

FIG. 2b is a flow chart illustrating an alternate flow of information in a transaction utilizing the automated transaction coordinator of the present invention.

DETAILED DESCRIPTION OF THE INVENTION

1. Parties to a Transaction

Figure 1:
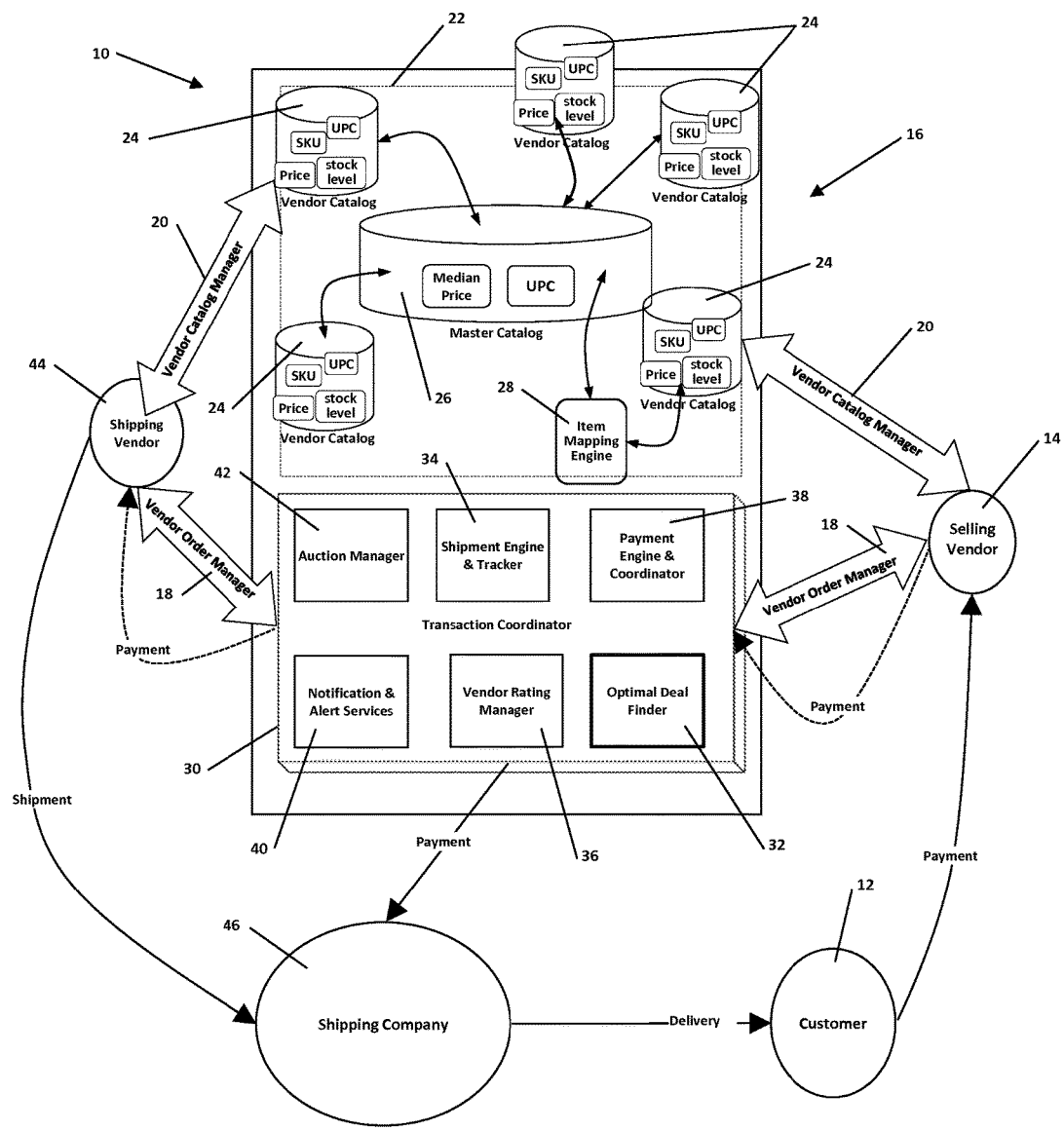
FIG. 1 is a schematic representation of the exemplary embodiment of the transaction coordination system of the present invention showing the parties involved in each transaction, the basic components of the system, and the flow of information between the parties to the transaction and the various components of the system.

The present invention provides a transaction optimization and coordination system for use with Internet or web-based transactions, especially those involving the purchase of consumer goods. With reference to FIG. 1, and according to an exemplary embodiment of the present invention, the transactions contemplated by this invention typically involve four or five parties to each transaction, namely: (i) a consumer who places an order from a computer terminal 12 which is connected to the Internet; (ii) the vendor who offers a particular product for sale on their website, referred to as the "selling vendor"; (iii) transaction optimization and coordination system 10, referred to as "hub" 16; and (iv) a vendor who ultimately arranges the delivery of the ordered product to the consumer, referred to as the "shipping vendor." A fifth party to the transaction, namely a shipping company such as Federal Express or UPS, may also be utilized in a given transaction. It is important to note that the role of selling vendor and shipping vendor may be reversed in some circumstances. For example, a selling vendor in one transaction may be identified as the most suitable shipping vendor in another transaction.

2. System Components

As also shown in FIG. 1, an exemplary embodiment of transaction optimization and coordination system 10 includes the following basic system components: consumer computer terminal 12, selling vendor server or system 14, hub 16, shipping vendor server or system 44, and shipping company server or system 46. In the context of the present invention, the term "server" is used in a generic sense and is meant to encompass whatever system configuration or architecture the various parties to a transaction have implemented as part of their business operations. Thus, "server" includes any and all hardware, including actual servers, end-user terminals, and other related hardware, and any and all software, including inventory management software, web pages or Internet sites (including those administered by offsite ISPs), and transaction management software. Hub 16 includes the following basic sub-components: catalog sub-component 22 and transaction coordinator 30. Catalog sub-component 22 includes at least one vendor catalog 24, master catalog 26 and catalog mapping engine 28. Transaction coordinator 30 includes the following basic sub-components or modules: vendor order manager 18, vendor catalog manager 20, optimal deal finder 32, shipping manager 34, vendor rating manager 36, payment manager 38, notification and alert manager 40, and auction manager 42. The various components and subcomponents of the system of the present invention are discussed in greater detail below.

Each transaction is initiated by a consumer or customer who, using computer terminal 12 has accessed a vendor's website seeking to purchase a particular product or products. While at the vendor's website, the consumer selects a product that he or she wishes to purchase, and places an order with the vendor for that particular product at the price stated on the website. The consumer typically selects a delivery option and then pays for the merchandise by entering a credit card number in a designated field on the vendor's Internet site. Thus, selling vendor server 14 receives the consumer's payment information before the order is actually processed.

The order placed by the consumer is received by the selling vendor server 14 where it is processed. However, rather than simply processing the order and shipping the merchandise to the consumer, the selling vendor's server may be configured to automatically query hub 16 in an attempt to "optimize" this particular transaction. In the context of the present invention, the term "optimize" refers to the system's ability to examine a number of available options, and based on the nature of the query itself, select the option that appears to be most advantageous to the parties involved in the transaction, whether it be the selling vendor, shipping vendor, consumer, or any combination thereof.

The transaction coordination component or "hub" provides both an extensive database of product related information and a sophisticated transaction coordination sub-component that examines potential shipping vendors and ranks these shipping vendors based on the nature of the query submitted to the hub by the seller vendor. Thus, the hub includes a large amount of data related to the various vendors and the products they offer for sale, as well as numerous software modules that process this data in correlation with additional information, such as shipping costs, and perform a qualitative analysis concerning suitable or "optimal" transaction partners.

As stated, the exemplary embodiment catalog subcomponent 22 includes vendor catalog manager 20, at least one vendor catalog 24, a master catalog 26, and catalog mapping engine 28. Vendor catalog manager 20 is a software module typically residing in catalog subcomponent 22 or on a vendor's server, or both, that provides the means by which each vendor that is part of the system of the present invention may provide new or different product data to the vendor catalogs. Vendor catalog manager 20 is also used by the various vendors to change, edit, and update all product information already included in the vendor catalogs.

For each vendor that is part of transaction optimization and coordination system 10, hub 16 maintains a database of product information that is specific to that particular vendor. This database is referred to as a "vendor catalog" and includes current and accurate information related to the products that each vendor has available for purchase. Each vendor is responsible for submitting, updating, and maintaining the information in their respective vendor catalogs either manually or through automated means. Information included in the vendor catalogs includes, but is not limited to, product names, product descriptions, UPC codes, product buying and selling prices, product availability (i.e., quantity in stock), and stock keeping unit numbers (SKUs). Much of this information will be vendor-specific, meaning that different vendors may provide different product information for the same actual products.

Master catalog 26 is a comprehensive or global database that is the primary source of information utilized by transaction coordinator 30. Master catalog 26 includes a global list of all of the products carried by all of the vendors, whether selling, shipping, or both, that are participating in the system of the present invention. Master catalog 26 also includes, but is not limited to, product information such as weight, manufacturer's suggested retail price, median vendor price, and other information about each vendor that may affect each vendor's likelihood of being chosen as a possible collaborator. Thus, the master catalog provides a highly detailed, standardized list of all of the products available to consumers at any given time and provides the basis for transaction coordinator 30 to determine optimal transactions given a certain set of starting parameters selected by the selling vendor who receives the original order from the consumer.

Master catalog 26 also includes additional storage for auxiliary information that links products to other products or links other types of information to products. For instance, the master catalog may contain a link between a product "baseball bat" and another product "baseball glove." Customers who purchase one of the items may potentially be interested in the other. The Hub utilizes this information to provide customer incentives or otherwise raise interest in a particular product.

Other auxiliary information may be stored in master catalog 26, such as product advertisements and discount coupons. One possible use of this information relates to displaying such advertisements or customer incentives on the selling vendor's website. Advertisements that are linked to a particular product are related to that item and thus more likely to draw the attention of the consumer. Hub 16 may collect revenue from advertisers which it may then shares with the selling vendor.

Catalog subcomponent 22, also includes catalog mapping engine 28 which serves as a data interface between the vendor catalogs and the master catalog. This interface processes information retrieved from all of the various vendor catalogs and "maps" the information to the master catalog where the information can easily be retrieved by transaction coordinator 30. The data stored in master catalog 26 has been converted into a standard, uniform format that includes universally accepted identifiers for a particular product. For example, for any given product, the master catalog provides a means for standardizing different SKU numbers utilized by different vendors. Likewise, the master catalog standardizes different UPC ("Universal Product Code") numbers utilized by different vendors.

The vendors that utilize the system of the present invention do not typically communicate with one another concerning a particular transaction; rather the shipping vendor that collaborates with the selling vendor is chosen automatically and anonymously by transaction coordinator 30. As described in greater detail below, after transaction processing has been initiated, transaction coordinator 30 seeks product information first from the selling vendor's catalog and then compares that data against the information found in the master catalog. Mapping engine 28 provides the means by which this information can be accurately compared and processed because it has effectively translated the selling vendor's product information into a common language" used by the master catalog without direct communication between the selling vendor and the shipping vendor being necessary.

The transaction coordinator is the system subcomponent that searches for, ranks, and identifies optimal transaction partners. In an exemplary embodiment of the present invention, and as shown in FIG. 1, transaction coordinator 30 is an assemblage of software modules that communicate with one another and catalog subcomponent 22 to identify "optimal" transaction partners.

Vendor order manager 18 is a software module typically residing in transaction coordinator 30 or on a vendor's server, or both, that provides the means by which each vendor that is part of the system of the present invention begins the query of hub 16 that will identify one or more optimal transaction partners. Vendor order manager 18 gathers the purchase order information from selling vendor server 14, formats it, and submits it to hub 16 for processing.

Optimal deal finder 32 is a software module residing within transaction coordinator 30 that receives purchase order information from vendor order manager 18 and executes the optimization and coordination analysis of the present invention. Optimal deal finder 32 queries both catalog subcomponent 22 and a number of other software modules residing within transaction coordinator 30. The other software modules queried by optimal deal finder 32 may include shipping manager 34, vendor rating manager 36, payment manager 38, notification and alert manager 40, and auction manager 42.

Shipping Manager 34 is a software module residing within transaction coordinator 30 that periodically or continually accesses shipping company server or system 46 for data concerning shipping costs, schedules, delivery options, and other information. The information accessed by shipping manager 34 is used by optimal deal finder 32 as part of the transaction optimization and coordination process carried out by the system of the present invention. Shipping manager 34 also tracks a particular product throughout the delivery process to assure that the consumer receives the product, or that it has reached the shipping vendor in the case of a merchandise return. A transaction is not typically considered completed until the product has reached its final destination.

Vendor rating manager 36 is a software module residing within transaction coordinator 30 that processes data found in master catalog 26 concerning the performance characteristics of each vendor. Over time, the ongoing process of order fulfillment accomplished by hub 16 will result in some vendors achieving greater efficiency and consistency than other vendors. Such desirable characteristics are quantified by vendor rating manager 36 and stored in master catalog 26. This data may be accessed by vendor rating manager 36 each time hub 16 is queried. As discussed below, the information processed by vendor rating manager 36 may be used to form the basis of an endorsement or certification aspect of the present invention.

Payment manager 38 is a software module residing within transaction coordinator 30 that manages and tracks the payments made to hub 16 by the selling vendor and the payments made by hub 16 to the shipping vendors and the shipping companies. Payment manager 38 also manages the charging and collection of commissions that hub 16 earns for successfully completed transactions.

Notification and alert manager 40 is a software module residing within transaction coordinator 30 that broadcasts information, such as the potential for a transaction, to the various vendors at certain times, using multiple means of communication (such as email, fax, instant messaging, cellular paging, etc.). Auction manager 42 is a software module residing within transaction coordinator 30 that creates and manages auctions (open, close bid, reverse) for certain transactions. See Example 5 for further discussion of an order auction.

As stated above, the shipping vendor is a vendor that is part of the system of the present invention that has been identified by hub 16 as a vendor that can ship a product to the consumer at a cost that is lower than the cost to the selling vendor for shipping the same product. Once a shipping vendor has been accepted by the selling vendor, vendor order manager 18 communicates with shipping vendor server or system 44 to coordinate the pickup and delivery of the product to the consumer.

Shipping company server or system 46 communicates with hub 16 by means of shipping manager 34. Shipping company server 46 provides updated information to transaction coordinator 30 and also provides the information necessary for shipping manager 34 to generate labels that the shipping vendor may place on the items that are delivered by the shipping company.

3. System Operation

As shown in FIG. 2A an exemplary, general overview of the flow of information through transaction optimization and coordination system 10 occurs as follows: (i) the consumer places order with selling vendor in step 200; (ii) the selling vendor accepts the order and queries hub 16 in step 205; (iii) hub 16 processes the order and identifies one or more shipping vendors in step 210; (iv) the selling vendor selects one of the shipping vendor options presented by hub 16 in step 215; (v) hub 16 confirms with the selected shipping vendor that the order can be fulfilled by that shipping vendor in step 220 (if no, the selling vendor selects another shipping vendor; if yes the transaction proceeds as shown in decision block 225); (vi) hub 16 charges the selling vendor the hub buying price (see below) in step 230; (vii) the hub pays the shipping vendor the hub selling price (see below) and pays the shipping company the cost of shipping the product in step 235; and (viii) the shipping company acquires the product from the shipping vendor and delivers it to the consumer in step 240. Shipping manager 34 tracks the order until the product has been delivered at which point the order is complete as shown in end block 245.

Alternately, as shown in FIG. 2B the flow of information through transaction optimization and coordination system 10 occurs as follows: (i) the consumer places order with selling vendor in step 200; (ii) the selling vendor accepts the order and queries hub 16 in step 205; (iii) hub 16 processes the order and identifies one or more shipping vendors in step 210; (iv) the hub 16 confirms with the selected shipping vendor that the order can be fulfilled by that shipping vendor in step 212 (if no, the hub identifies another shipping vendor as shown in decision block 225); (v) if yes, the selling vendor accepts the transaction offered by hub 16 in step 227; (vi) hub 16 charges the selling vendor the hub buying price (see below) in step 230; (vii) the hub pays the shipping vendor the hub selling price (see below) and pays the shipping company the cost of shipping the product in step 235; and (viii) the shipping company acquires the product from the shipping vendor and delivers it to the consumer in step 240. Shipping manager 34 tracks the order until the product has been delivered at which point the order is complete as shown in end block 245.

As stated, a typical transaction utilizing the system and method of this invention begins with the consumer or customer accessing selling vendor's website by means of the Internet, usually from a computer terminal located in the home or office. It is important to note that the present invention is not limited to Internet-based transactions, and in other embodiments, the transaction is based on catalog purchases that are conducted over the telephone or by other means. The next step in the typical Internet-based transaction involves the consumer browsing selling vendor website and selecting one or more items for purchase.

After the consumer has selected the product or products that they wish to purchase, the consumer places an order on selling vendor website and submits certain relevant customer information. This customer information typically includes a credit card number and a delivery destination for the products (in one embodiment, only a ZIP or postal code may be used for transaction optimization). The customer also selects a time period for delivery such as "next day air," "second day air," "five-day ground," etc. based on the options that are presented to the consumer at selling vendor website. After the consumer credit card information is verified by the selling vendor, processing of the order begins. The first step in the order processing stage of the transaction is to query hub 16 concerning optimization and coordination of the transaction. Once the query is underway, the process of order fulfillment includes the first step of selecting an optimal transaction partner, i.e., "transaction optimization," and after the optimal partner has been identified and accepted, the second step of coordinating the transaction, i.e., "transaction coordination."

4. Transaction Optimization

Figure 3:
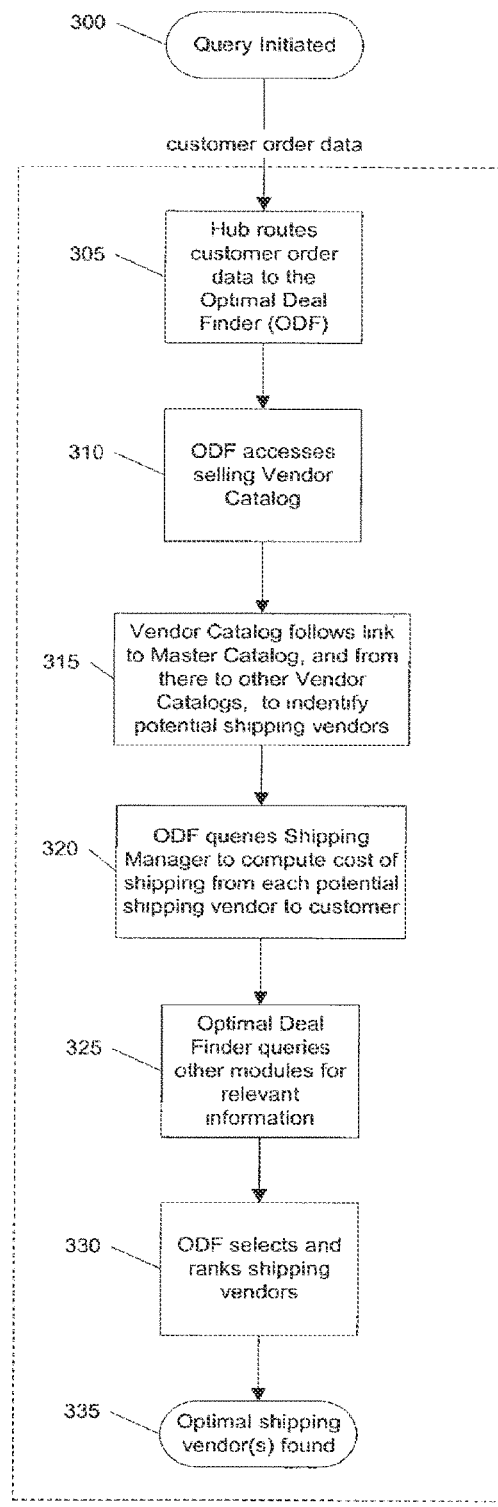
FIG. 3 is a flow chart illustrating an exemplary transaction optimization process.

As shown in FIG. 3, an exemplary, general overview of the process of transaction optimization as accomplished by transaction optimization and coordination system 10 is as follows: (i) the selling vendor's query to hub 16 is initiated as shown in block 300; (ii) customer order data is received by hub 16 by means of vendor order manager 18 and routed to optimal deal finder 32 in step 305; (iii) optimal deal finder 32 accesses selling vendor's catalog 24 in step 310; (iv) vendor catalog 24 accesses master catalog 26 and identifies possible shipping vendors in step 315; (v) optimal deal finder 32 queries shipping manager 34 for shipping-related information in step 320; (vi) optimal deal finder 32 queries the other software modules in transaction coordinator 30 for any other relevant information available about the vendors in step 325; and (vii) optimal deal finder 32 selects and ranks shipping vendors as shown in end block 330 at which point the optimal shipping vendor is considered to have been found as shown in end block 335.

Hub 16 selects optimal transaction partners by processing and comparing information and/or data about each vendor that is participating in transaction optimization and coordination system 10. Each analysis or comparison may be based on a number of possible criteria or search parameters, including, but not limited to: (i) purchase price, (ii) hub buying price, (iii) hub selling price, (iv) actual shipping cost, (v) sales tax, (vi) delivery time, (vii) commission to be earned by transaction optimization and coordination system 10, (viii) available inventory, and (viii) subjective criteria such as vendor rating. In the context of the present invention, the following definitions are applicable.

"Purchase price" refers to the dollar amount the consumer pays for the product that they have purchased from the selling vendor's website. This dollar amount typically includes the selling vendor's price for the merchandise plus the cost for shipping the goods to the final destination chosen by the consumer. The cost for shipping the goods to their final destination may vary depending on the delivery option chosen by the consumer, and is generally determined by the selling vendor (which implies it may be higher that the cost demanded by the shipping company to deliver the product, typically including "handling charges").

The "hub buying price" refers to the actual dollar amount that a selling vendor pays hub 16 to execute a particular transaction. Because the selling vendor is not actually delivering a product from its own inventory, the selling vendor must "buy" the merchandise from the hub (and indirectly from another vendor that is identified by the hub as a possible shipping vendor). Thus, the hub buying price reflects the dollar amount that the selling vendor is willing to pay to, have the hub (i.e., another vendor) deliver the merchandise to the consumer. A portion of the commission charged by hub 16 to optimize and coordinate the transaction may also be included in the hub buying price, as well as the shipping cost the shipping company will charge to transport the goods from the shipping vendor to the customer. The actual cost of shipping the goods to the consumer is typically calculated by transaction coordinator 30 based on data obtained from the shipping companies utilized by hub 16.

The "hub selling price" refers to the actual dollar amount at which a shipping vendor agrees to "sell" its goods to hub 16 to participate in a particular transaction. Because the shipping vendor does not actually receive the original order from the consumer, the shipping vendor must be willing to sell merchandise from its inventory to hub 16 so that the transaction can be executed.

The "actual shipping cost" refers to the actual dollar amount that a shipping company such as UPS or Federal Express will charge the shipping vendor to deliver merchandise to a particular destination. This dollar amount can be calculated by transaction coordinator 30 based on current information obtained by shipping manager 34 from shipping vendor server or system 46. The calculated amount is typically added to the dollar amount that the selling vendor pays for the transaction, and the combined amounts equal the hub buying price.

The "commission" is the dollar amount charged by hub 16 to the one or both of the vendors involved in any particular transaction. In some embodiments, the commission is a fixed dollar amount, while in other embodiments, the commission charged to the parties is based on the amount of savings that hub 16 is able to generate based on the variables involved in coordinating a transaction.

The selling vendor's query of hub 16 may occur in several ways based on the embodiment of the present invention that is being utilized by the selling vendor. The selling vendor may query hub 16 in real time, meaning that once the consumer's order has been accepted, the selling vendor immediately queries the hub seeking to identify an optimal shipping vendor. Hub 16 executes the transactional analysis and immediately provides the selling vendor with a list of options regarding shipping vendors. Based on the analysis of hub 16 in this type of scenario, the consumer, while they are still at the selling vendor's website, may be presented with delivery options differing from the choice they initially made when purchasing the product. Convincing the consumer to change their delivery option, may result in additional earnings for hub 16, i.e., a higher commission being charged to the vendors. For example, the consumer may be offered the option to receive the goods the next day at a cost lower than typical overnight shipping, but higher than regular shipping. The difference between the original (regular) shipping cost the consumer was going to pay and the new shipping cost represents the additional amount gained through the transaction.

In an alternate embodiment, the consumer's order and customer information is accepted by selling vendor server 14, but may be submitted to hub 16 at another time, along with other pending transactions. Thus, the selling vendor, either manually or automatically, must later decide between various possible shipping vendors identified by hub 16. The consumer is not typically consulted in this embodiment of the present invention.

A third embodiment presents certain purchasing or shipping options to the consumer while they are still in the process of browsing the selling vendor's website. This approach attempts to create interest in or awareness of certain products or shipping options based on known preferences or other information specific to a particular consumer. Thus, this approach may utilize certain consumer information that has been acquired through the use of cookies placed on the consumer's computer or by other methods, such as geographic localization of the IP address.

Regardless of the timing of the selling vendor's query of hub 16, vendor order manager receives the order information from selling vendor's server 14 and queries optimal deal finder 32 which resides within transaction coordinator 30. Optimal deal finder 32 then accesses the selling vendor's catalog 24 so that information about a particular product or products may be obtained. Vendor catalog 24 in turn accesses master catalog 26 to gather information about all other vendors in the system that carry the same product or products.

An important aspect of the deal optimization is the handling of situations where an order contains more than a single product. In such cases, the optimal deal finder 32 may identify multiple vendors that can optimize the transaction (each for one or more of the different products in the original order, or for partial quantities of the same product). Even if the same shipping vendor is identified for all products, it may be that the items need to be shipped as separate packages, as is the case for products of substantial volume or weight.

Optimal deal finder 32 addresses these situations by "splitting" each order into several transactions with one product each, and attempting to optimize these transactions individually. Optimal deal finder 32 then regroups transactions that can be optimized by the same vendors, or otherwise determines the optimal way to optimize the entire group of transactions.

After optimal deal finder 32 has gathered the relevant product and vendor information, it gathers shipping information from shipping manager 34. As stated above, shipping manager 34 includes software provided by one or more preferred shipping companies. Preferably, the shipping companies utilized by hub 16 update their servers and systems frequently or even continuously, thereby providing up-to-date information when queried by shipping manager 34. The cost of shipping a product from a particular shipping vendor's place of business to the consumer is a significant variable in identifying optimal transaction partners.

After the shipping information has been retrieved and processed, optimal deal finder 32 may query the other software modules within transaction coordinator 30 for additional quantitative or qualitative data concerning particular vendors. Based on the information and/or data retrieved and processed, optimal deal finder 32 selects one or more shipping vendors that optimize the transaction. Recall that in the context of the present invention, "optimize" means that collaboration a between an identified shipping vendor and the selling vendor provides benefits to both parties that neither party would have realized if the selling vendor had simply fulfilled the order itself.

In one embodiment, the list of optimal shipping vendors is based solely on the data and and/or data retrieved and processed by hub 16. The list is assembled and presented to the selling vendor for consideration, i.e., approval or rejection. Alternately, hub 16 may identify a shipping vendor and, without any input from the selling vendor, instruct the shipping vendor to deliver the product. In this instance, hub 16 verifies the availability of the product in the shipping vendor's inventory, and does not seek the approval of the selling vendor before executing the transaction. This embodiment is useful when the entire transactional process is automated and no human interaction is required or desired.

In identifying an acceptable shipping vendor, optimal deal finder 32 considers both the hub buying price and the hub selling price, both of which are typically found in the vendor catalogs. So that the selling vendor may realize a profit from the transaction, the dollar amount of the hub buying price is typically lower than the price at which the selling vendor originally sold the product to the consumer. Thus, the dollar amount that the selling vendor is willing to pay hub 16 to have a particular product shipped by another vendor covers the price that the shipping vendor is demanding for the product, plus any shipping costs. Profits are realized by the system when the following is true:

Hub Buying Price.gtoreq.Hub Selling Price+Shipping Cost

Transaction coordinator 30 also considers a number of other factors when selecting optimum transaction partners for the selling vendor that has submitted a query to hub 16. Such other factors may include, but is not limited to, return policies, product availability, and the past performance of particular vendors. Past performance measures or ranking are included in master catalog 26.

The benefits realized by the parties to the transaction flow from the selling vendor's initial query to hub, and are derived primarily from cost optimization, i.e., reduction of transaction cost or from optimization of delivery time. By way of illustration, cost optimization or reduction or transaction cost is achievable in the following situations: (i) similar product pricing and lower shipping cost (Example 1); (ii) different product pricing (Example 2); (iii) combination of different product pricing and lower shipping costs (Example 3); (iv) elimination of sales tax (Example 4). Reduction of transaction cost may also be achieved by order auction (Example 5), or order broadcast (Example 6). Delivery time optimization (Example 7) provides an additional means by which an optimal shipping vendor may be identified. Note that it is possible to combine variable factors: cost, delivery time, product warranties offered by the vendors, vendor ratings, etc. when optimizing the transaction based on multiple parameters.

All examples mentioned above illustrate the optimization of transactions involving goods. However, hub 16 has the capability of optimizing transactions for service providers as well. Example 8 provides a case scenario for a typical situation involving services.

In the normal course of transaction, and in the examples presented below, the shipping vendor is compensated for shipping the goods to the consumer through payment made to the shipping vendor. However, in one embodiment of the system, it is possible for the shipping vendor to be partially or fully compensated through inventory replenishment. For example, if a large quantity of products is shipped by the same shipping vendor on behalf of the same selling vendor within a certain period of time, the hub 16 may mediate a bulk shipment of products from the selling vendor to the shipping vendor. The selling vendor thus replenishes the inventory of the shipping vendor, and no longer has to compensate the latter for the shipped goods (note that the shipping vendor is paid a fraction of the savings realized through the various transactions however). Because shipping the goods in bulk is significantly less costly that shipping them individually, savings are realized versus a situation where the selling vendor does not utilize hub 16 and ships the goods directly to its customers.

As a byproduct of processing numerous transactions, hub 16 will develop a large working network of vendors. It is possible to optimize both the flow of goods and the flow of money through the system so that more than the typical two vendors (selling and shipping vendors) are involved. The following example is illustrative of this scenario.

A vendor located in California (CA) has fulfilled a number of orders on behalf of a vendor located in Connecticut (CT). A third vendor, located in Texas (TX), has fulfilled a comparable number of orders on behalf of the CT vendor. The arrangements call for the CT vendor to replenish the inventory of the CA vendor (a bulk shipment from CT to CA) and for the TX vendor to replenish the inventory of the CT vendor (a bulk shipment from TX to CT).

Rather than executing two shipments across the country, one from CT to CA and one from TX to CT, the Hub coordinates a single shipment from TX to CA, thus settling both transactions with one shipment and generating substantial savings in the process.

In order for this kind of optimization to occur, the number and kind of goods that the vendors need to settle should be equivalent. However, this is only one example of how such multi-vendor optimization may function. A large number of vendors and transaction settlements may be part of the optimization process. Hub 16, having access to large amounts of data, is capable of executing such optimization attempts. Shipments to customers, shipments among vendors, and financial settlements among vendors and hub 16 may all be part of this large-scale process.

As a result of transaction optimization executed by hub 16, the goods involved in some transactions may travel reduced distances and spend less time in transit to a final destination. For valuable packages that are insured during transport, reduced travel distance and time can translate to reduced insurance premiums, which may be proportional to the distance traveled by the goods. Hub 16 can therefore achieve additional savings in the transportation process by identifying opportunities to reduce insurance costs.

In its typical mode of operation, hub 16 optimizes transactions while keeping vendors anonymous and keeping vendor catalogs transparent to each other. However, in certain circumstances hub 16 may to grant vendors access to certain other vendor catalogs through a subscription model.

In this embodiment, vendors who operate an e-commerce website may want to offer products for sale that they do not normally carry in their inventory. For example, a vendor who sells flowers recognizes that customers frequently purchase chocolates along with flowers, but does not have the ability or interest of carrying an inventory of chocolates. For such a vendor, it may be beneficial to establish a strategic alliance with a different retailer who specializes in chocolates.

Hub 16 enables such alliances through a "publish & subscribe" mechanism. Vendor catalogs can optionally be "published," with or without the knowledge of the owner (i.e., publishing vendor). Once a catalog has been published through hub 16, other vendors can "subscribe" to it and gain access to the products it contains. The information can either be obtained manually or automatically displayed on the website of the subscribing vendor. Orders placed for such "subscribed" products can be manually or automatically routed through the hub 16, where the order will be directed to the publishing vendor, or potentially to a different vendor that is has been identified as optimal for that particular transaction.

Example 1

Reduction of Transaction Cost where Products are Similarly Priced

This example focuses on optimizing a transaction when the prices of the item involved in the transaction are similar for all vendors in the system. In this situation, the emphasis is placed on identifying a shipping vendor that is geographically closer to the customer than the selling vendor so that shipping costs are reduced. This scenario is most likely to occur if the consumer wants the item delivered overnight and/or the weight of the item is relatively large.

1. Selling vendor (vendor 1) is located in California (CA); customer is located in Connecticut (CT).
2. Customer places an order with the selling vendor for an item that costs $100. The customer chooses to have the item delivered via overnight (air) shipping from CA to CT at a cost of $30. The total cost of the order is $100+$30=$130.
3. Selling vendor collects $130 from the customer.
4. Selling vendor places order with the Hub.
5. Hub identifies a suitable shipping vendor (vendor 2) in New York (N.Y.). Because vendor 2 is very close to the customer, the item can be shipped via ground shipping and still arrive the next day (as the customer expects).
6. Hub determines that the shipping cost from NY to CT via ground is only $5.
7. Hub collects $115 from vendor 1. Vendor 1 keeps the remaining $15 as a gain from the transaction. Vendor 1 does not have to package and ship the item. In fact, vendor 1 need not actually have the item in its inventory.
8. Hub places order with vendor 2 and pays vendor 2 $109 for the item. Vendor 2 realized a gain on the sale of $9 in addition to the regular profit included in the $100 price of the item. Moreover, vendor 2 obtained this sale without any marketing, advertising, or customer support expenses.
9. Hub places a delivery request with the shipping company and pays the shipping company $5. The shipping company picks the item up at the location of vendor 2 and delivers it to the customer.
10. As a result of this transaction, the Hub realized a $1 gain ($130−$15−$109−$5=$1)

This particular transaction generated savings of $25, resulting from the difference between the overnight shipping cost from CA to CT ($30) and the ground shipping cost from NY to CT ($5). However, the amount of these savings is unknown to the two vendors because the parties to a transaction typically remain anonymous. From the perspective of the selling vendor, the transaction cost $115, and from the perspective of the shipping vendor, the cost is $109. These numbers, however, are generated by hub 16, which could have retained a higher commission for the transaction, and paid each vendor a smaller percentage of the savings.

If the item is very heavy, the cost of delivery from CA to CT may be very large simply due to the weight, and not the delivery method (overnight is substantially more expensive than ground). In this case, substantial savings could be realized by shipping the item from NY even though the shipping type was ground from either location (CA or NY).

Example 2

Different Product Pricing

In this scenario, the emphasis is not set on the difference in shipping cost from one vendor to the customer versus the second vendor to the customer, but rather on the difference in the two vendors' pricing concerning a particular product.

1. Selling vendor (vendor 1) is located in New York (N.Y.); customer is located in Connecticut (CT).
2. Customer places an order with the selling vendor for an item that costs $100. The customer chooses to have the item delivered via ground shipping from New York (N.Y.) to CT at a cost of $5. The total cost of the order is $100+$5=$105.
3. Selling vendor collects $105 from the customer.
4. Selling vendor places order with the Hub.
5. Hub identifies a suitable shipping vendor (vendor 2) in California (CA). Vendor 2 is a wholesaler and has lower pricing for this item. Instead of the $100 vendor 1 is regularly charging, vendor 2 only charges $90. This lower pricing may also be the result of the fact that the item is sold to the hub, and not a regular customer. The hub receives preferential pricing for various reasons, such as guaranteed payment (no charge-backs), the opportunity for orders without any marketing expenses, etc.
6. Hub computes the ground shipping cost from CA to CT to be $7.
7. Hub collects $99 from vendor 1. Vendor 1 keeps the remaining $6 as a gain from the transaction. Vendor 1 does not have to package and ship the item. In fact, vendor 1 need not actually have the item in its inventory.
8. Hub places order with vendor 2 and pays vendor 2 $90 for the item. Vendor 2 realized this sale and any associated profit without any marketing, advertising, or customer support expenses.
9. Hub places a delivery request with the shipping company and pays the shipping company $5. The shipping company picks the item up at the location of vendor 2 and delivers it to the customer.
10. As a result of this transaction, the Hub realized a $2 gain ($105−$6−$90−$7=$2).

Note that even though the cost of shipping from vendor 2 to the customer was higher than the shipping cost from vendor 1 to the customer, the hub was still able to generate savings by leveraging the pricing difference.

Example 3

Different Product Pricing and Lower Shipping Costs

This scenario is similar to Examples 1 and 2 and progresses in a similar fashion. However, in this case the hub looks for potential shipping vendors that have both lower pricing and a favorable location, leading to a maximization of savings realized through the transaction. In Example 1, the savings were $25 due to reduced shipping costs. In Example 2, the savings were $10 due to lower pricing. In a favorable situation, the Hub may identify a combination of the two factors that leads to total savings of $35, which could be distributed in various ways among the three parties involved in the transaction.

Example 4

Elimination of Sales Tax

This example illustrates how the hub can indirectly help to reduce the cost of a transaction and increase the savings realized by the vendors by shifting the sales tax responsibility to the consumer.

1. Vendor 1 and the customer are both located in the same state, Connecticut (CT).
2. The customer places an order for an item that costs $100. The vendor is required by law to charge a 6% sales tax on the item, resulting in a total of $106 for the customer
3. The hub identifies a shipping vendor, vendor 2, located in New York (N.Y.).

Shipping costs and delivery times from NY to CT are comparable to those from CT to CT.

4. The hub "transfers" the order from vendor 1 to vendor 2. Vendor 2 is not required to pay sales tax, so the total for the customer is now only $100, resulting in savings of $6.

5. Vendor 2 bills the customer for $100 and ships the item. The customer is now responsible for paying the $6 sales tax, but the sale presented an incentive due to the lowered cost.

Example 5

Order Auction

This scenario differs from the previous examples only in the way the optimal vendor is selected. All examples presented so far have assumed that the potential shipping vendors have fixed pricing. However, a list may be assembled that includes vendors that carry the item and are within a desired shipping cost and delivery time range (which may or may not correspond to a geographic radius) from the customer, i.e., the item can be delivered within a time period which may be less or equal than the original time span, but may also be greater.

For instance, if the customer ordered the item to be delivered via overnight shipping, only shipping vendors that can deliver the item the next day (via either overnight or ground shipping) are included on the list of optimal vendors. However, if the customer ordered the item to be delivered via ground shipping, that automatically implies a certain uncertainty in the delivery time. Five business days may easily become 7 calendar days, if the weekend falls in-between. This provides for additional flexibility in including vendors on the optimal list.

Once the list of potential shipping vendors has been assembled, the order offer is sent to all these vendors without specific pricing information. Interested vendors then reply with an offer with the lowest offer winning the bid. The auction can either be closed (vendors are not aware of each other's bids) or open (the current lowest bid is made public).

This method for selecting an optimal vendor results in significant savings because the hub selects a vendor based on the combined analysis of the auction bid and the cost of delivery from that vendor to the location of the customer. Other factors, such as vendor rating, may also affect the choice of vendor.

Example 6

Order Broadcast

This scenario applies in particular in situations where no optimal vendor identified by the hub. This may happen if all vendor catalogs indicate low stock because they are not current. In other words, the potential for a transaction exists, but the hub has insufficient or incorrect data and cannot make an automatic decision.

In order to resolve the situation, the hub can broadcast the transaction opportunity to a list of vendors that can be assembled based on various criteria. In addition to including only vendors who can deliver the item in the required time span, the Hub may also focus on vendors who normally carry this item, and are thus more likely to have the item in stock even though their published catalogs indicate otherwise. As a result of the order broadcast, several vendors may respond positively, confirming that they are able to ship the item. The hub then selects the optimal vendor from this subset of vendors.

Example 7

Reduction of Delivery Time

In this scenario, the customer is invited to "upgrade" the delivery method at a lower-than-normal cost. This way, additional funds are obtained from the customer, which are equivalent to the "savings" realized in the previous examples, and can be distributed among the parties involved in the transaction.

1. Selling vendor (vendor 1) is located in California (CA); customer is located in Connecticut (CT).

2. Customer places an order with the selling vendor for an item that costs $100. The customer chooses to have the item delivered via ground shipping from CA to CT at a cost of $7 and over a period of 5 business days. The total cost of the order is $100+$7=$107.

3. Selling vendor collects $107 from the customer.

4. Selling vendor places order with the Hub.

5. Hub identifies a suitable shipping vendor (vendor 2) in New York (N.Y.). Vendor 2 demands $100 for the item. Vendor 2 is much closer to the customer and can deliver the item in only one business day via ground shipping.

6. Hub computes the ground shipping cost from NY to CT to be $5.

7. Hub presents vendor 1 with the option of having the item delivered in only one business day.

8. vendor 1 contacts the customer and offers to "upgrade" the shipping type from ground and delivery in 5 business days to "overnight ground"# at an additional cost of $10. The customer thus pays $17 for having the item delivered overnight ($7 original shipping cost+$10 upgrade). Regular overnight shipping for the same item would normally cost $30 (see Example 1). The customer is thus offered savings of $13.

9. Hub collects $110 from vendor 1. vendor 1 keeps the remaining $7 as a gain from the transaction.

10. Hub places order with vendor 2 and pays vendor 2 $104 for the item.

11. Hub places a delivery request with the shipping company and pays the shipping company $5. The shipping company picks the item up at the location of vendor 2 and delivers it to the customer.

12. As a result of this transaction, the hub realized a $1 gain ($117−$7−$104−$5=$1)

In this scenario, the customer gains satisfaction by having the item delivered the next day at a price lower than it would normally cost for overnight delivery.

Example 8

Optimization of Transactions Involving Services

Services can also constitute the object of optimization through hub 16. Rather than shipping goods on behalf of other vendors, members of the hub network may provide services directly to customers. The following scenario illustrates this situation.

1. Selling vendor is located in California (CA), customer is located in New York (N.Y.).

2. Customer places an order with the selling vendor for an air conditioner that is very heavy. This is an item that is very suitable for optimization through the hub because it is very heavy and substantial savings can be realized through the system. The selling vendor also agrees to provide installation and servicing for the appliance.

3. Hub identifies a suitable shipping vendor in located in NY. This vendor is very close to the customer, and can conveniently deliver, install, and service the air conditioner.

4. Hub performs the transaction similar to the previous examples. In addition the hub mediates an installation and servicing agreement between the selling and shipping vendors.

By utilizing the hub, the CA vendor extended its market to the East Coast, which may have not been possible without the system, or would have been prohibitively expensive (the selling vendor would have had to establish a local service center in NY).

5. Transaction Coordination

Figure 4:
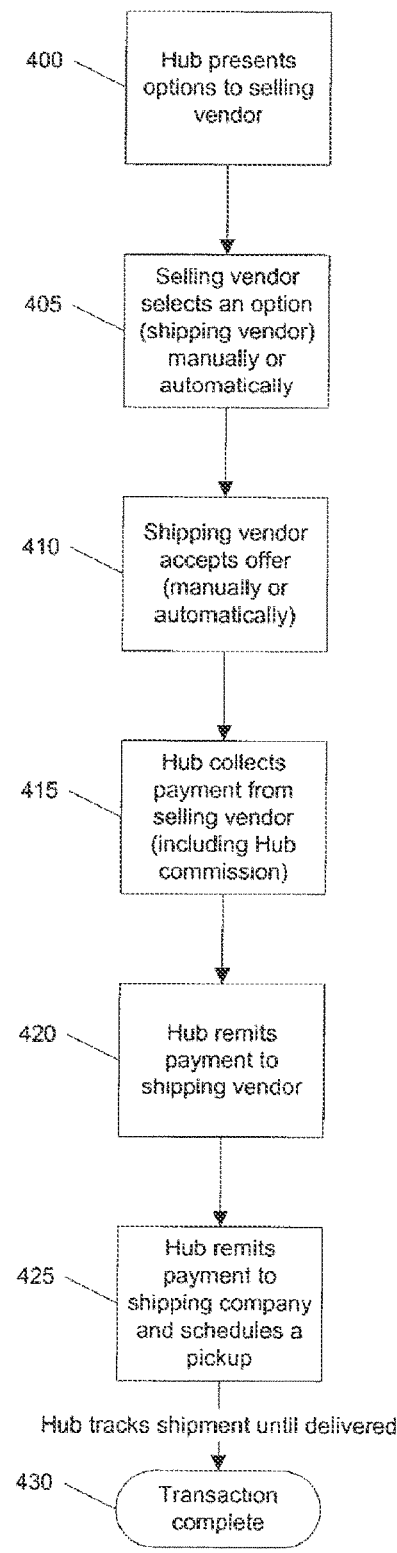
FIG. 4 is a flow chart illustrating an exemplary transaction coordination process.

As shown in FIG. 4, an exemplary, general overview of the process of transaction coordination as accomplished by transaction optimization and coordination system 10 is as follows: (i) hub 16 presents the various shipping vendors that it has identified to the selling vendor in step 400; (ii) the selling vendor selects one of the shipping vendors (manually or automatically) in step 405; (iii) the shipping vendor accepts the offer from hub 16 in step 410; (iv) hub 16 collects payment (including commission) from the selling vendor in step 415; (v) hub 16 pays the shipping vendor in step 420; (vi) hub 16 pays the shipping company and schedules a time for the product to be picked up at the shipping vendor's place of business in step 425; and (vii) hub 16 tracks the shipment until the product reaches the destination indicated by the consumer at which point the transaction is considered complete as shown in end block 430.

One important feature of hub 16 is that in most instances, the selling vendor and shipping vendors have no contact with one another. Anonymity is a concern from the hub administrator's perspective because if vendors learn of each other, they may seek to collaborate without utilizing the system of the present invention. Some selling vendors may not wish for certain shipping vendors to have access to certain customer information, so in essence all that hub 16 requires to process an order is a credit card number and a zip code. Furthermore, the transaction optimization and coordination process in entirely transparent to the consumer, who is unaware that the product they order has been delivered from a vendor that is not the vendor that originally received the consumer's order. This transparency is facilitated by the hub's capability to generate shipping labels that do not include any vendor information or customer information. The customer information is typically hidden from the shipping vendor because the shipping vendor may utilize this information to send promotional materials and acquire the customer from the selling vendor. For similar reasons, hub operating guidelines or procedures prohibit the shipping vendor from including any promotional materials in the package that is sent to the customer.

As with the delivery shipping costs, return shipping costs may also be reduced for transactions that are routed through hub 16. If an item was shipped from a vendor that is geographically closer to the customer than the selling vendor, the item will be sent back to the shipping vendor in the event of a return. As such, the shipping cost for the return is lower than if the item had been sent to and from the selling vendor.

Figure 5:
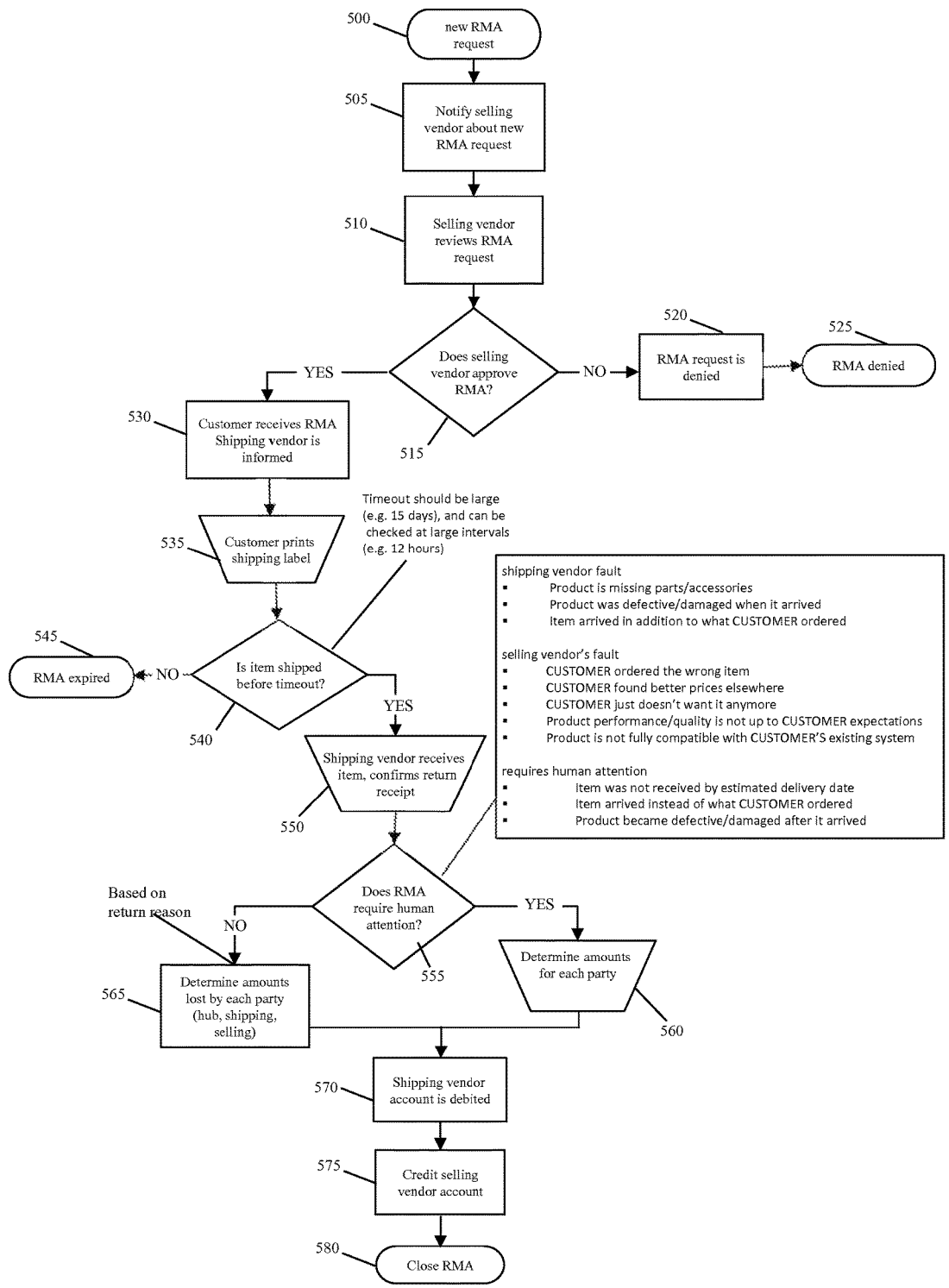
FIG. 5 is a flow chart illustrating the flow of information in an exemplary returned merchandise scenario.

Unlike regular orders processed by hub 16, where only two parties are involved (i.e., selling vendor and customer), for orders placed through hub 16 there are two additional intermediaries, the shipping vendor and the hub itself. As shown in FIG. 5, the return process begins with an new return merchandise authorization (RMA) request 500 issued by the customer, either directly into the hub through a co-branded interface, or through the selling vendor as shown in steps 505 and 510. The selling vendor decides 515 to denies the RMA request as in steps 520 and 525, or approves the RMA 530 (according to the policies it and/or the shipping vendor set when the sale was made), at which point an RMA number, shipping labels, and a tracking number are issued in step 535. The customer receives these labels (either by downloading them from the hub or through the selling vendor), affixes them to the package, and hands the package to the carrier. The hub automatically monitors the tracking number to identify when the package was finally shipped. Since the RMA has an expiration date, the tracking number and shipping labels have limited validity as well, and the customer must ship the package within the allotted time period as shown in step 540. If shipping does not occur before timeout, the RMA expires as shown in end block 545.

Once the package is in transit, the shipping vendor is alerted of the pending delivery. When the package is received and the shipping vendor verifies 550 that the returned products are in the expected condition 555, the hub determines the payment amounts for each party in steps 560 and 565. The hub will charge the shipping vendor 570 an amount equal to the value of the return (as agreed and computed based on the return reasons and any policies that were attached to the original order, which the shipping vendor established and/or implicitly accepted by accepting the order). Next, the selling vendor will be credited 575 an amount corresponding to computations within the hub. The selling vendor handles any customer refunds and the RMA closes in step 580.

The amounts charged from and refunded to each party involved are based on business rules implemented within the hub, which take into consideration factors such as the reason for the return and the condition of the returned items, as reported by the shipping vendor. In most cases, it should be possible to determine these amounts automatically, while in some remote cases human interaction may be utilized.

In the course of processing and optimizing numerous transactions, hub 16 will amass a large amount of qualitative data concerning the various vendors that participate in the system of the present invention. In one embodiment, the hub utilizes this data to build expertise and compute industry averages and other useful measures for assessing the quality of a particular vendor's business practices. Such assessments of vendor performance are useful for creating a "vendor certification" program whereby vendors that perform at a high level based on standards created by the hub are awarded "hub certification." A seal attesting to this certification can be placed on the websites of such vendors as evidence of a high level or quality and performance. This certification program is aimed in particular at attesting that a given vendor charges reasonable amounts for shipping the goods to the consumer. Through its large amount of comparative vendor information, hub 16 may determine what amounts are reasonable. This may be either facilitated by obtaining the shipping costs directly from hub 16 in real time or through the hub's evaluation of vendor's shipping charge policies.

While the above description contains many specificities, these should not be construed as limitations on the scope of the invention, but rather as exemplification of preferred embodiments. Numerous other variations of the present invention are possible, and it is not intended herein to mention all of the possible equivalent forms or ramifications of this invention.

What is claimed is:

1. A method for coordinating a business transaction between a selling vendor and a plurality of shipping vendors, the method comprising the steps of:
   (a) providing a transaction coordination hub comprising:
       (i) a catalog subcomponent, the catalog subcomponent comprising:
           (A) a plurality of vendor catalog databases managed by a vendor catalog manager software module for storing detailed vendor-related data associated with a plurality of vendors;
(B) at least one master catalog database; and
(C) a mapping engine for mapping information in the plurality of vendor catalog databases to the master catalog, the mapping engine configured to perform the steps of:
(1) translating a selling vendor's product information into a common language;
(2) comparing the selling vendor's product information to the vendor-related data stored in the plurality of vendor catalog databases; and
(3) processing the selling vendor's product information; and
(ii) a vendor rating manager configured to process data found in the master catalog concerning the performance characteristics of each vendor;
(iii) a payment manager configured to manage and track payments made to the transaction coordination hub by the selling vendor and payments made by the transaction coordination hub to shipping vendors and shipping companies;
(iv) a notification and alert manager configured to broadcast information, including a potential for a transaction, to the selling vendor and shipping vendors, using an electronic communication; and
(v) an auction manager configured to create and manage auctions for transactions;
(vi) a transaction coordinator subcomponent for coordinating transactions between the selling vendors and the shipping vendors, the transaction coordinator subcomponent comprising an optimal deal finding module for analyzing data in the catalog subcomponent while maintaining anonymity between the selling vendor and the shipping vendor;
(b) receiving, at the transaction coordination hub, from a selling, vendor server associated with a selling vendor, a request to ship a product;
(c) analyzing, by the transaction coordination hub, the request by:
(i) querying, by the transaction coordination subcomponent, the catalog subcomponent and at least one of the shipping manager, the vendor rating manager, the payment manager, the notification and alert manager or the auction manager, the querying comprising the steps of:

(A) obtaining, by a vendor order managing module from the selling vendor server, purchase order information associated with the product,
(B) transmitting, by the vendor order managing module to the optimal deal finding module, the purchase order information;
(C) selecting, by the transaction coordination subcomponent, one or more shipping vendors as one or more optimal transaction partners based at least in part on the purchase order information;
(ii) transmitting, by the notification and alert manager to at least one shipping vendor of the one or more selected shipping vendors, potential for a transaction; and
(iii) pairing the at least one shipping vendor with the selling vendor to execute a business transaction; and
(d) approving, automatically, the at least one shipping vendor based at least in part on an approval input of the at least one shipping vendor, the approval step comprising reviewing the data retrieved and processed by the transaction coordination hub;
(e) accepting, by the transaction coordination hub, an electronic offer of the transaction based at least in part on the approval input of the shipping vendor;
(f) collecting, by the transaction coordination hub using the payment manger, electronic payment, including commission from the selling vendor;
(g) paying, by the transaction coordination hub using the payment manger, the shipping vendor;
(h) scheduling, by a shipping management module, a time for product retrieval by a shipping company;
(i) paying, by the payment manager, the shipping company;
(j) tracking, by the transaction coordination hub, the product in accordance with changed origination of the product until delivery to a consumer; and
(k) assessing, by the shipping management module, shipping instructions, which direct deliver of the product, wherein the product is delivered to a desired recipient.

2. The method of claim 1, further comprising the step of generating, by the transaction coordination hub, a shipping label that does not comprise at least one of selling vendor information or consumer information and providing the shipping label to the shipping vendor.

* * * * *